(12) United States Patent
Breslin et al.

(10) Patent No.: US 10,470,484 B2
(45) Date of Patent: Nov. 12, 2019

(54) APPARATUS FOR PROCESSING A GRAIN PRODUCT

(71) Applicant: Process Partners, Inc., Zeeland, MI (US)

(72) Inventors: James C. Breslin, Zeeland, MI (US); Stephen J. Kalchik, Battle Creek, MI (US); Michael F. Raymond, Center Tuftonboro, NH (US)

(73) Assignee: Process Partners, Inc., Zeeland, MI (US)

( * ) Notice: Subject to any disclaimer, the term of this patent is extended or adjusted under 35 U.S.C. 154(b) by 358 days.

(21) Appl. No.: 15/596,099

(22) Filed: May 16, 2017

(65) Prior Publication Data

US 2017/0245532 A1    Aug. 31, 2017

Related U.S. Application Data

(62) Division of application No. 14/244,430, filed on Apr. 3, 2014, now Pat. No. 9,648,901.

(Continued)

(51) Int. Cl.
*F26B 9/00* (2006.01)
*A23L 7/10* (2016.01)
(Continued)

(52) U.S. Cl.
CPC .............. *A23L 7/197* (2016.08); *A23L 5/30* (2016.08); *A23L 7/196* (2016.08); *A23V 2002/00* (2013.01)

(58) Field of Classification Search
CPC .. F26B 9/00; F26B 21/00; F26B 21/06; A23L 7/197; A23L 7/196; A23L 5/30; A23V 2002/00

(Continued)

(56) References Cited

U.S. PATENT DOCUMENTS 4,916,830 A * 4/1990 Braun .................. F26B 25/002
                                                         34/550
5,176,931 A    1/1993 Herbster
(Continued)

FOREIGN PATENT DOCUMENTS

JP      55-151918         11/1980
JP      2011063871 A  *  3/2011
(Continued)

OTHER PUBLICATIONS

PCT Search Report and Written Opinion dated Aug. 8, 2014 for corresponding PCT Application No. PCT/US2014/032821, filed Apr. 3, 2014.

*Primary Examiner* — Stephen M Gravini
(74) *Attorney, Agent, or Firm* — Gardner, Linn, Burkhart & Ondersma LLP

(57) ABSTRACT

An apparatus for preparing a shelf-stable processed grain product includes a series of heating and cooling stages performed on a processed grain product having a water activity value of about 0.65 or less. A first heating stage takes the grain pieces to a first elevated temperature, which is followed by a first cooling stage. The grain pieces are passed to a second heating stage to reach a second elevated temperature, followed by a second cooling stage. The grain pieces are then passed to a third heating stage, after which they are sufficiently soft and pliable for a final forming stage such as flaking, bumping, puffing, or the like. This allows grain pieces that are suitable for long term storage, but too brittle for final forming, to be softened for final forming without raising the moisture content to a point that is conducive to mold formation or reduced product quality.

18 Claims, 6 Drawing Sheets

Related U.S. Application Data

(60) Provisional application No. 61/811,308, filed on Apr. 12, 2013.

(51) Int. Cl.
*A23L 7/196* (2016.01)
*A23L 5/30* (2016.01)

(58) Field of Classification Search
USPC .......................................................... 34/266
See application file for complete search history.

(56) References Cited

U.S. PATENT DOCUMENTS

| | | | |
|---|---|---|---|
| 5,567,457 A | 10/1996 | Martinek et al. | |
| 5,570,521 A * | 11/1996 | Baker | F26B 17/122 34/550 |
| 6,082,251 A | 7/2000 | Kendall et al. | |
| 6,139,892 A | 10/2000 | Fredlund et al. | |
| 6,156,365 A | 12/2000 | Liwszyc | |
| 8,252,355 B2 | 8/2012 | Mizuno et al. | |
| 8,479,408 B2 * | 7/2013 | Salisbury | F26B 17/122 34/166 |
| 8,726,539 B2 * | 5/2014 | Potter | F26B 9/02 165/54 |
| 9,456,623 B2 * | 10/2016 | Silbermann | A23B 9/08 |
| 9,534,840 B2 * | 1/2017 | Pahwa | F26B 21/083 |
| 9,648,901 B2 | 5/2017 | Breslin et al. | |
| 9,885,520 B1 * | 2/2018 | Abbasi | F26B 21/12 |
| 10,126,050 B2 * | 11/2018 | Jensen | F26B 3/02 |
| 10,267,511 B2 * | 4/2019 | Knight, Jr. | B01D 47/00 |
| 2002/0006464 A1 | 1/2002 | Wefers | |
| 2003/0008049 A1 | 1/2003 | Wilson et al. | |
| 2006/0115561 A1 | 6/2006 | Heywood et al. | |
| 2007/0031575 A1 | 2/2007 | Green et al. | |
| 2009/0087527 A1 | 4/2009 | Belanger et al. | |
| 2011/0274815 A1 | 11/2011 | Kim et al. | |
| 2012/0201946 A1 | 8/2012 | Fukumori et al. | |
| 2012/0244266 A1 | 9/2012 | Ku et al. | |
| 2014/0193557 A1 | 7/2014 | Nakayoshi et al. | |
| 2014/0308411 A1 * | 10/2014 | Breslin | A23L 7/197 426/242 |
| 2017/0245532 A1 * | 8/2017 | Breslin | A23L 7/197 |

FOREIGN PATENT DOCUMENTS

| | | | |
|---|---|---|---|
| WO | 97/41737 | 11/1997 | |
| WO | 01/76388 | 10/2001 | |
| WO | WO-2016006046 A1 * | 1/2016 | A23L 3/36 |

\* cited by examiner

APPARATUS FOR PROCESSING A GRAIN PRODUCT

CROSS REFERENCE TO RELATED APPLICATIONS

The present application is a divisional of U.S. patent application Ser. No. 14/244,430, filed Apr. 3, 2014, which claims the benefit of U.S. provisional application Ser. No. 61/811,308, filed Apr. 12, 2013, which are hereby incorporated herein by reference in their entireties.

FIELD OF THE INVENTION

The present invention relates generally to methods and devices for modifying a starch matrix within a gelatinized stable grain product to convert the grain product to relatively soft and formable grain pellets or pieces.

BACKGROUND OF THE INVENTION

A conventional manufacturer of pelletized cereal (grain) products regulates the desired texture, consistency, hardness and/or brittleness of the grain pellets by adjusting the moisture content of the pellets prior to converting the pellets into flakes or other ready-to-eat ("RTE") cereal products. Typically, such procedures include the steps of cooking, pelletizing, drying, flaking and toasting the grain in a sequential and substantially uninterrupted sequence of steps in a substantially continuous production process. Delays or separation between individual steps for operations in the sequential process increases the risk of undesirable physical and/or chemical changes in the properties of the grain product, which can result in inconsistent product characteristics that impact the desirability of the finished product to consumers.

In typical processes, the presence of moisture in the grain pellets renders them relatively soft and pliable, so that a subsequent forming operation, such as "bumping" (i.e., compressing between two rollers turning at substantially the same speed), flaking (e.g., with two rollers operating at different speeds), puffing, or other milling operation can be used to change the shape of the pellets, grits, or other pieces, in order to reach or closely approximate the desired finished shape of the grain product, such as for use in a ready-to-eat cereal product. If the grain pellets or pieces are not sufficiently soft and pliable, the flaking or other milling operation can shatter them, so that they cannot be formed to the desired finished shape.

Typically, a water activity value of approximately 0.75 or greater has been required to achieve satisfactory flaking, bumping, puffing, or other milling of the partially gelatinized grain pellets. "Water activity" is a unitless ratio defined as the vapor pressure of water contained within a substance (e.g., a grain product) at a given temperature, divided by the vapor pressure of pure water at the same temperature, and is generally considered to be a reliable measure of a product's ability to avoid mold or bacterial growth. Water activity also affects moisture migration between adjacent products having different moisture levels. For purposes of discussion, water activity may be thought of, in a simplified manner, as relating to the relative humidity of the air located in voids between particles within a grain product.

In traditional processes, once the grain pellets are flaked, bumped, or puffed to the general desired shape, they are typically toasted to achieve a ready-to-eat cereal product. In typical processes, the partially-gelatinized grain pellets, having a water activity value of about 0.75 or greater, will have a temperature of approximately 90 to 150 degrees Fahrenheit as they leave a drying step and enter a final forming stage of flaking, bumping, puffing, or the like. The grain product is typically moved directly to the final forming stage from the drying step, or from a cooling and tempering period to help equalize moisture within the grain product following drying, to limit or prevent the formation of mold on the grain product.

SUMMARY OF THE INVENTION

The present invention provides a method for softening grain pieces (pellets, grits or other naturally-shaped pieces, etc.) that have been dried to a sufficiently low water activity as to be shelf-stable for an extended period of time, so that they may be passed through a final forming stage (bumping, flaking, puffing, or the like), and substantially without the addition of moisture. This softening is accomplished with a conditioning process that involves a series of heating and cooling/tempering cycles, which modifies the starch matrix (i.e., the arrangement of starch molecules and molecular bonds within a pocket or cell of starch molecules) in the grain pieces by aligning the starch molecules and molecular bonds within the starch matrix of a given grain pellet, grit, or other particle or piece. Prior to the conditioning process, the grain particles have a low water activity value, typically about 0.65 or less, which inhibits or substantially prevents mold growth, but the starch molecules are also misaligned and at least partially gelatinized, which gives the grain particles a brittle or "glassy" characteristic that is not conducive to final forming processes. The conditioning process of the present invention modifies the internal structure and alignment of the starch matrix, thereby converting the texture or characteristic of the grain pellet, piece, or grit from a generally hard crystalline form to a relatively soft and pliable form, but without the need for adding moisture, which could make the grain product susceptible to mold growth.

According to one aspect of the present invention, a method of preparing a shelf-stable processed grain product includes a series of heating and cooling/tempering steps performed on a processed grain product having a water activity value of about 0.65 or less. The method includes first, second and third heating steps, a first tempering step occurring between the first and second heating steps, and a second tempering step occurring between the second and third heating steps. The processed grain product initially has a relatively hard and brittle characteristic and, through the series of heating and tempering steps, achieves a relatively softer and more flexible characteristic. The first heating step takes the processed grain product to a first elevated temperature. The first tempering of the processed grain product takes the processed grain product to a first reduced temperature that is less than the first elevated temperature. The second heating of the processed grain product takes the processed grain product to a second elevated temperature that is greater than the first reduced temperature. The second tempering of the processed grain product whereby the processed grain product reaches a second reduced temperature that is less than the second elevated temperature. The third heating of the processed grain product takes the processed grain product to a third elevated temperature that is greater than the second reduced temperature. Once the processed grain product has completed the series of heating and tempering steps to achieve the desired softer and more flexible characteristic, it is ready for final forming such as flaking, bumping, puffing, or the like.

Thus, the present invention provides a method or system for modifying the structure of starch molecules in a processed grain product, such as for use in ready-to-eat cereals. The method utilizes a series of alternating heating and cooling/tempering steps to convert a relatively brittle but low water activity grain product, to a softened grain product that remains low in water activity value, but is softened and ready to be bumped, flaked, or puffed to achieve a finished or nearly finished cereal product. The ability to condition a brittle high density half product (grain pellet, grit, or naturally-shaped piece) with a low water activity value, into having a relatively soft or non-brittle material property or characteristic that retains a low water activity value, allows for indefinite-length storage and/or transport of the half product prior to final forming by flaking, bumping, or puffing the product. This adds flexibility to the manufacturing process and allows for more advantageous use of commodities and facilities used in grain processing, such as by reducing or eliminating the need to run a continuous step-by-step process.

These and other objects, advantages, purposes and features of the present invention will become apparent upon review of the following specification in conjunction with the drawings.

DESCRIPTION OF THE PREFERRED EMBODIMENTS

Figure 1:
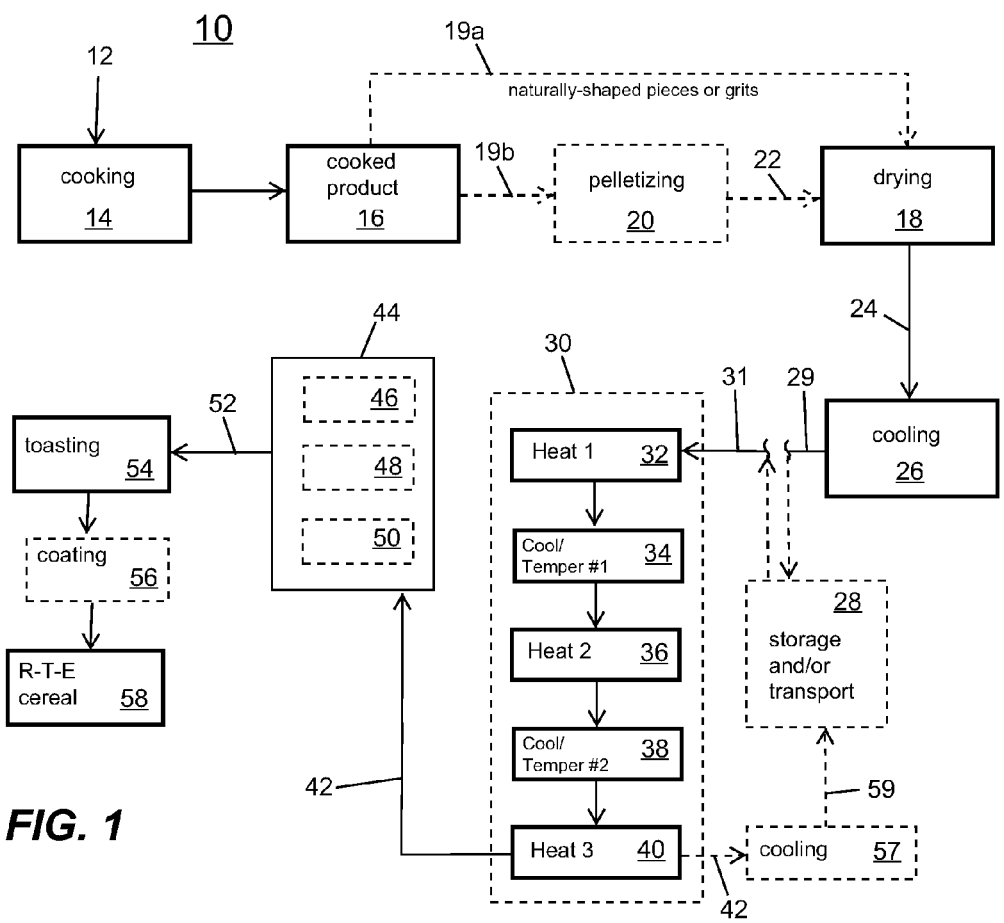
FIG. 1 is a flow diagram depicting a method of processing a grain product in accordance with the present invention.

Referring now to the drawings and the illustrative embodiments depicted therein, a method of modifying the structure of starch molecules within a processed grain product allows for the creation of soft and formable grain pieces (typically pellets, grits, or naturally-shaped pieces) from dried grain pieces that previously had a hard and brittle consistency, but that were (and remain) relatively shelf-stable due to a low-water activity value. The soft and formable characteristic of the grain pieces facilitates final forming, such as by flaking, puffing, bumping, or the like. However, from the conclusion of an earlier drying step, the water activity value of the grain pieces is sufficiently low to inhibit mold growth, so that the later processing steps may be delayed far longer than has typically been possible in conventional grain processing methods. Therefore, the process of converting raw grains to finished cereal products may be separated or divided into separate processes, at separate locations, and with the option of storing the unfinished grain products for prolonged periods, even weeks or months, between the production of a dried and shelf-stable grain pellet or grit or naturally-shaped piece, and the final processing steps that result in a finished ready-to-eat cereal product, substantially without adversely affecting the quality or consistency of the final product.

In contrast to conventional grain processing, the present processing method 10 (FIG. 1) allows for grain pieces to be cooked and then dried to a relatively low water activity value (typically about 0.65 or less) at which they can be stored for prolonged periods, and then the grain pieces may be subsequently softened to achieve a soft or formable characteristic utilizing alternating heating and cooling/tempering of the grain pieces, and without need for the higher water activity values of conventional methods. In the illustrated embodiment of FIG. 1, raw grain products 12 (which may be any one or more of: rice, wheat, oats, barley, sorghum, corn, substantially any form of bran, or the like) are initially cooked 14 via substantially any known method, which results in a cooked grain product 16 that may be in the form of naturally-shaped particles or pieces. Cooked grain product 16 may be passed directly to a drying step 18 as naturally-shaped pieces or grits 19a, for example. Optionally, an intermediate pelletizing step 20 may be conducted in an agglomerator or the like, to convert selected grain components 19b (e.g., one or more types of bran, cracked wheat, etc.) of cooked grain product 16 into grain pellets 22, which are then passed along to drying step 18. The cooked grain product 16, whether in the form of naturally-shaped particles or grits 19a, or as grain pellets 22, is at least partially gelatinized, with starch molecules that are substantially misaligned within each grain pellet or particle, having a water activity value between about 0.93 and about 0.96, and a relatively soft texture or characteristic, before they enter drying step 18. The above-described steps of processing method 10, including cooking 14, drying 18 and pelletizing 20 may be performed using methods that are well known in the art.

Dried grain pieces 24 exit the drying step 18 with reduced moisture content and water activity compared to their moisture level and water activity when they entered the drying step 18. The water activity value of dried grain pieces 24 is at or below approximately 0.65, and typically is in the range of about 0.5 to 0.63. Preferably, the water activity value of dried grain pieces 24 is about 0.60 to about 0.63. In addition, the dried grain pieces 24 are no longer soft or deformable as when they entered drying step 18, and are now relatively hard or glassy upon exiting drying step 18. Optionally, a cooling step 26 is used to reduce the temperature of dried grain pieces 24 to approximately room temperature, following drying step 18. In this condition, cooled and dried grain pieces 29 have substantially non-aligned starch molecules and a water activity value of approximately 0.65 or less, so that cooled and dried grain pieces 29 may be stored for extended periods, for example six months or more, using conventional grain product storage and/or shipping methods and conditions, and substantially without compromising the product quality. However, in this state, cooled and dried grain pieces 29 are sufficiently hard and glassy so that further processing (flaking, bumping, puffing, etc.) generally cannot be performed with desirable results, because the brittle grain pieces would be shattered and pulverized into undesirably small particles.

In a more conventional process, the dried grain pieces have a sufficiently high water activity value when they exit a dryer so that they are sufficiently soft and formable to be passed directly into a final forming process such as flaking, bumping, puffing, etc. However, in the present processing method 10, the dried grain pieces are typically cooled and hardened to a dryer condition that is suitable for storage or shipping/transportation, but is less suitable to final forming processes for the reasons described above. The present method 10 applies a multi-step heating and cooling/tempering process 30 to cooled and dried grain pieces 31 (at least some of which may have been stored for an extended period), which process aligns the starch molecules within the grain pieces to achieve an amorphous plastic or rubbery or pliable consistency of the grain pieces, which conditions them for final forming, and which is accomplished substantially without the addition of moisture. This allows cooled and dried grain pieces 29 to be optionally stored and/or shipped or transported 28 for an extended period, in a shelf-stable condition, prior to the final forming.

In the illustrated embodiment of FIG. 1, multi-step heating and tempering process 30 is a five-step process in which heating and cooling/tempering steps are alternated in a manner that results in aligned starch molecules within the cooled and dried grain pieces 31 to achieve the desired amorphous plastic or rubbery or pliable consistency that is appropriate and ready for final forming, substantially without the further addition of moisture. Cooled and dried grain pieces 31, having a water activity value of about 0.65 or less, and a relatively hard and brittle characteristic or consistency, enter a first heating step 32 in which they achieve a first elevated temperature of about 170 degrees Fahrenheit. In first heating step 32, it is desirable to heat the grain pieces from room temperature at a rate sufficient to achieve the first elevated temperature of about 170 degrees Fahrenheit within a first heating period of about 5 to 15 seconds, such as by applying infrared radiation having a wavelength of about 0.7 microns. The grain pieces exit first heating step 32 and are cooled and tempered in a first cooling/tempering step 34 over a period of about 5 to 10 seconds, which relaxes the matrix of starch molecules (i.e., loosens or weakens their molecular bonds) within each grain piece, to thereby facilitate subsequent alignment of the starch molecules.

Following first tempering step 34, a second heating step 36 raises the temperature of the grain pieces to a second elevated temperature of about 210 degrees Fahrenheit. Preferably, second heating step 36 is performed over a period of about 10 to 20 seconds, optionally using infrared radiation having a wave length of about 0.5 microns, to reach the second elevated temperature from the first reduced temperature of first tempering step 34. The grain pieces are then directed from second heating step 36 to a second tempering step 38, to achieve a second reduced temperature, which is desirably reached in about 3 to 10 seconds, to align the starch molecules and the molecular bonds in the starch matrix. Following second tempering step 38, the grain pieces enter a third heating step 40, in which a third elevated temperature of about 210 degrees Fahrenheit is reached, to thereby to align the starch molecules with one another in the grain pieces. Preferably, the third elevated temperature of about of 210 degrees Fahrenheit is reached within a period of about 5 to 20 seconds of heating, using infrared radiation having a wavelength of about 0.7 microns.

Heated and tempered grain pieces 42 exit third heating step 40 with an amorphous plastic or rubbery or pliable consistency, and a water activity value that remains low (about 0.65 or less), and are ready for a final forming process 44, which may involve any one or more of flaking 46, puffing 48 and bumping 50, to achieve a formed grain product 52. The formed grain product 52 may then be directed to final processing steps such as toasting 54, and the application of one or more coatings 56, to obtain a finished ready-to-eat cereal product 58. It is generally desirable for heated and tempered grain pieces 42 to enter final forming process 44 sufficiently quickly so that the temperature of the grain pieces 42 is at least about 185 degrees Fahrenheit following the approximately 210 degrees Fahrenheit of third heating step 40, so that the grain pieces 42 do not become too brittle for the final forming process 44.

Optionally, heated and tempered grain pieces 42 may be directed into a cooling step 57 so that the temperature of the tempered grain pieces 42 drops below about 185 degrees Fahrenheit before the final forming process 44, and they can be stored or shipped/transported (e.g., via overland truck, train, ship, or other vehicle) as shelf-stable grain pieces 59. In that case, however, it will typically be necessary to conduct another multi-step heating and tempering process on the grain pieces 59, at higher temperatures than described above for process 30, to thereby re-condition the previously-tempered grain pieces 59 to be sufficiently soft and pliable for final forming process 44.

The multi-step heating and tempering process 30 of FIG. 1 may be performed using a system 60 (FIG. 2) having first, second and third infrared heaters 62a-c that are used to conduct first heating step 32, second heating step 36 and third heating step 40, respectively. In the preferred embodiment, the first infrared heater 62a emits infrared radiation at a wavelength of about 0.7 microns, the second infrared heater 62b emits infrared radiation at a wavelength of about 0.5 microns, and the third infrared heater 62c emits infrared radiation at about 0.7 microns. Optionally, heaters 62a-c are infrared quartz heaters. Cooled and dried grain pieces 31 are carried along a belt conveyor 64, which passes below infrared heaters 62a-c. In the illustrated embodiment, it is desirable that cooled and dried grain pieces 31 are deposited along belt conveyor 64 in a layer that is about 1 to 1.5 inches thick. Infrared heaters 62a-c are spaced about 4 to 8 inches above the layer of grain pieces 31, or about 5 to 9.5 inches above a top surface 64a of belt conveyor 64. Optionally, it is envisioned that the heating steps of the present method may be accomplished by directing heated air at the dried grain pieces, so that at least a portion of each heating step is accomplished by convection, rather than substantially by radiation as in system 60, described above.

Figure 2:
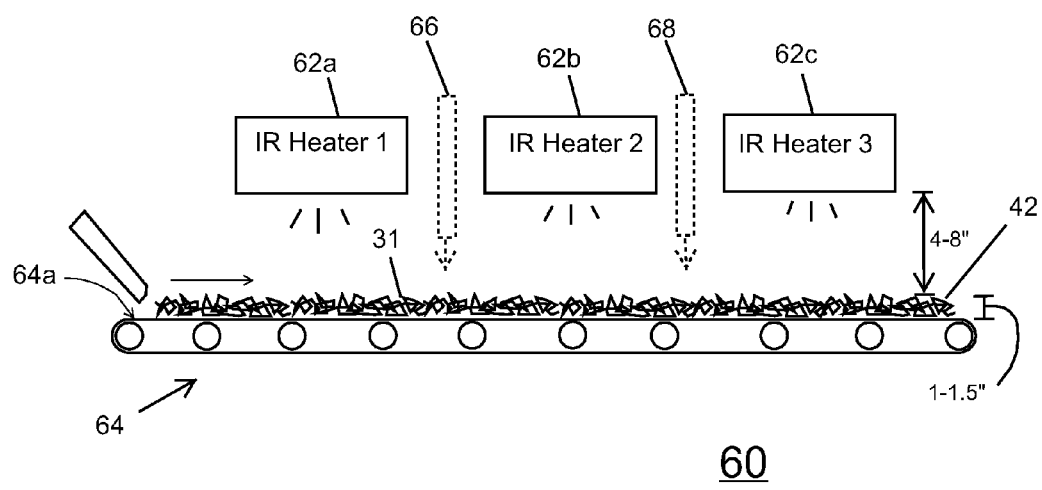
FIG. 2 is a diagram of a production area for use in conducting a heating and tempering portion of the method of FIG. 1.

In the illustrated embodiment of FIG. 2, cooling and tempering of dried grain pieces 31 occurs between first infrared heater 62a and second infrared heater 62b (i.e., first tempering step 34), and again between second infrared heater 62b and third infrared heater 62c (i.e., second tempering step 36). Dried grain pieces 31 spend sufficient time between the infrared heaters so that natural cooling and tempering takes place in the presence of ambient air, prior to the grain pieces passing beneath the next infrared heater. Optionally, and as shown in phantom lines in FIG. 2, a first tempering apparatus 66 may be disposed between first infrared heater 62a and second infrared heater 62b, while a second tempering apparatus 68 may be disposed between second infrared heater 62b and third infrared heater 62c, for use in conducting the first and second tempering steps 34, 38 respectively. Tempering apparatuses 66, 68 may be air blowers blowing ambient or chilled air, for example, to ensure that a desired amount of cooling and tempering takes place for the dried grain pieces between heating steps. Optionally, temperature sensors may be placed along system 60 to monitor the temperature of dried grain pieces 31 along conveyor 64 and, optionally, to use the temperature information for making automatic adjustments to conveyor speed, the output of one or more of the infrared heaters 62*a-c,* or the output of the optional tempering apparatuses 66, 68.

Figure 3:
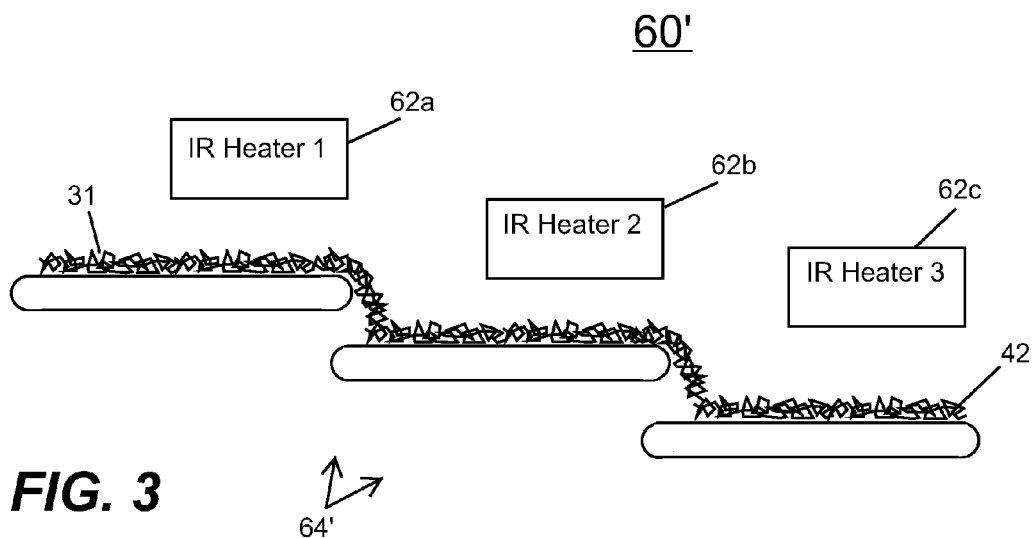
FIG. 3 is a diagram of another embodiment of a production area for use in conducting a heating and tempering portion of the method of FIG. 1.

Optionally, a mixing apparatus may be disposed along belt conveyor 64, for mixing and/or agitating the grain pieces during heating and tempering process 30, as the grain pieces pass beneath infrared heaters 62*a-c* and optional tempering apparatuses 66, 68. The mixing apparatus may use mixing paddles or vibration of belt conveyor 64 to mix and agitate the grain pieces as they move along belt conveyor 64. It is further envisioned that the grain pieces may be "fluidized" by vibration or pressurized air moving upwardly through a fixed bed or chute, so that the grain pieces will essentially flow along the bed without need for a moving conveyor surface. For example, a vibratory conveyor bed operating at a vibration frequency of about 6.7 to 8.3 Hz has been found to provide adequate mixing during the heating and tempering process. Mixing or agitation of dried grain pieces during heating and tempering process 30 improves the uniformity of all of the grain pieces that pass through system 60. Optionally, and as shown in FIG. 3, another system 60' has a belt conveyor 64' includes a series of descending steps that agitate or mix the dried grain pieces as they undergo the heating and tempering process 30, and that helps to ensure that substantially all sides of the grain pieces are exposed to radiant energy from the infrared heaters 62*a-c*.

It is envisioned that the multi-step heating and tempering process 30 and subsequent final forming process 44 may be performed on a single piece of machinery or equipment. For example, and with reference to FIGS. 4 and 5, a combination grain-conditioning and flaking mill 70 includes infrared heaters 62*a-c* and a stepped conveyor 64" at its upper end portion. Dried grain pieces are fed onto an upstream end portion of conveyor 64" via a feed chute 72, and they are moved along conveyor 64" (right to left as viewed in FIG. 4), on which they are heated by the infrared heaters 62*a-c* in sequence, with cooling/tempering areas located upstream and downstream from second heater 62*b*. Optionally, infrared heaters 62*a-c* may be pivotally mounted to an upper portion of a framework 74 via hinges 76, so that the heaters may be raised (shown in phantom in FIG. 5), such as for cleaning or servicing the conveyor 64".

Figure 4:
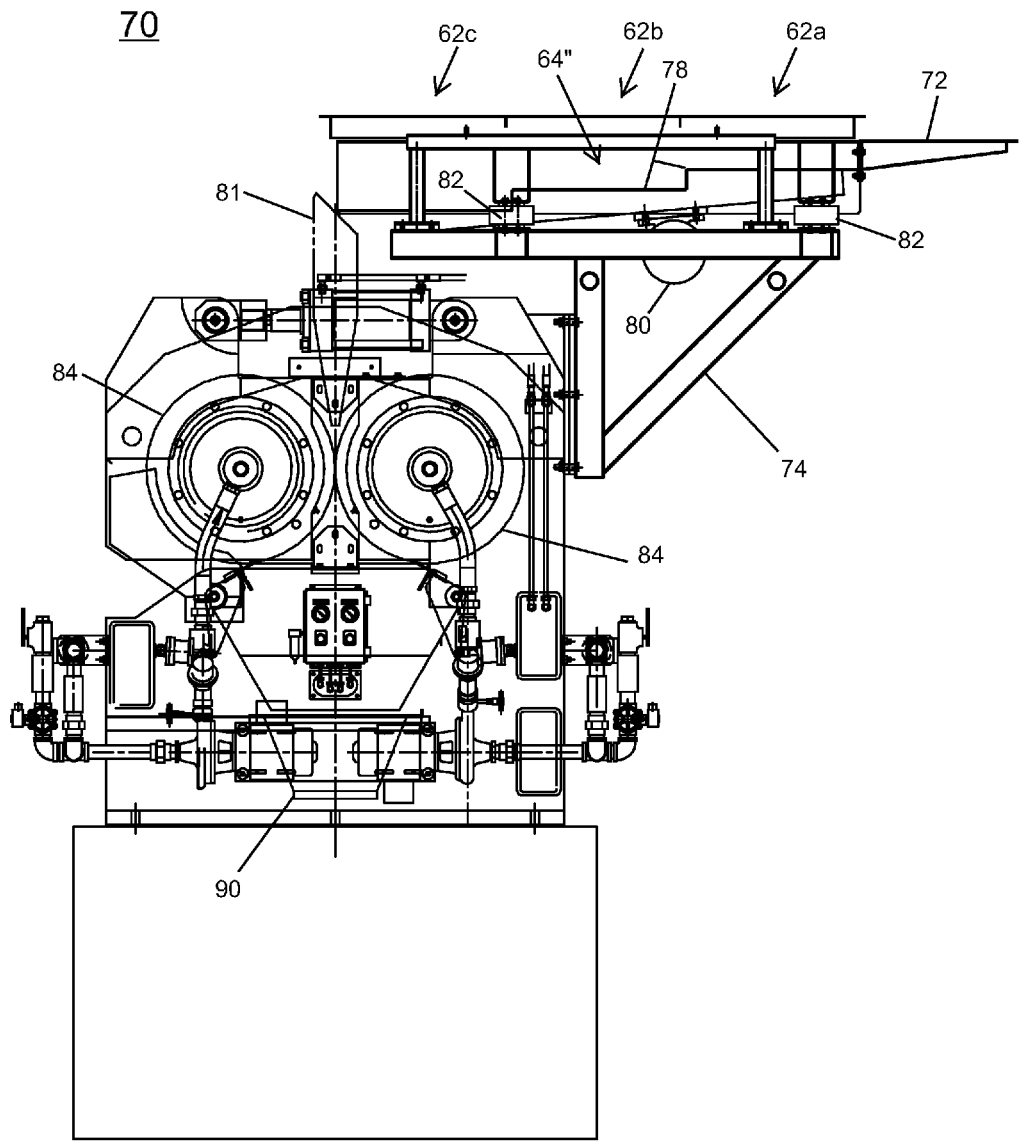
FIG. 4 is a side elevation of a grain conditioning and flaking apparatus that can be used in performing the method of the present invention.
Figure 5:
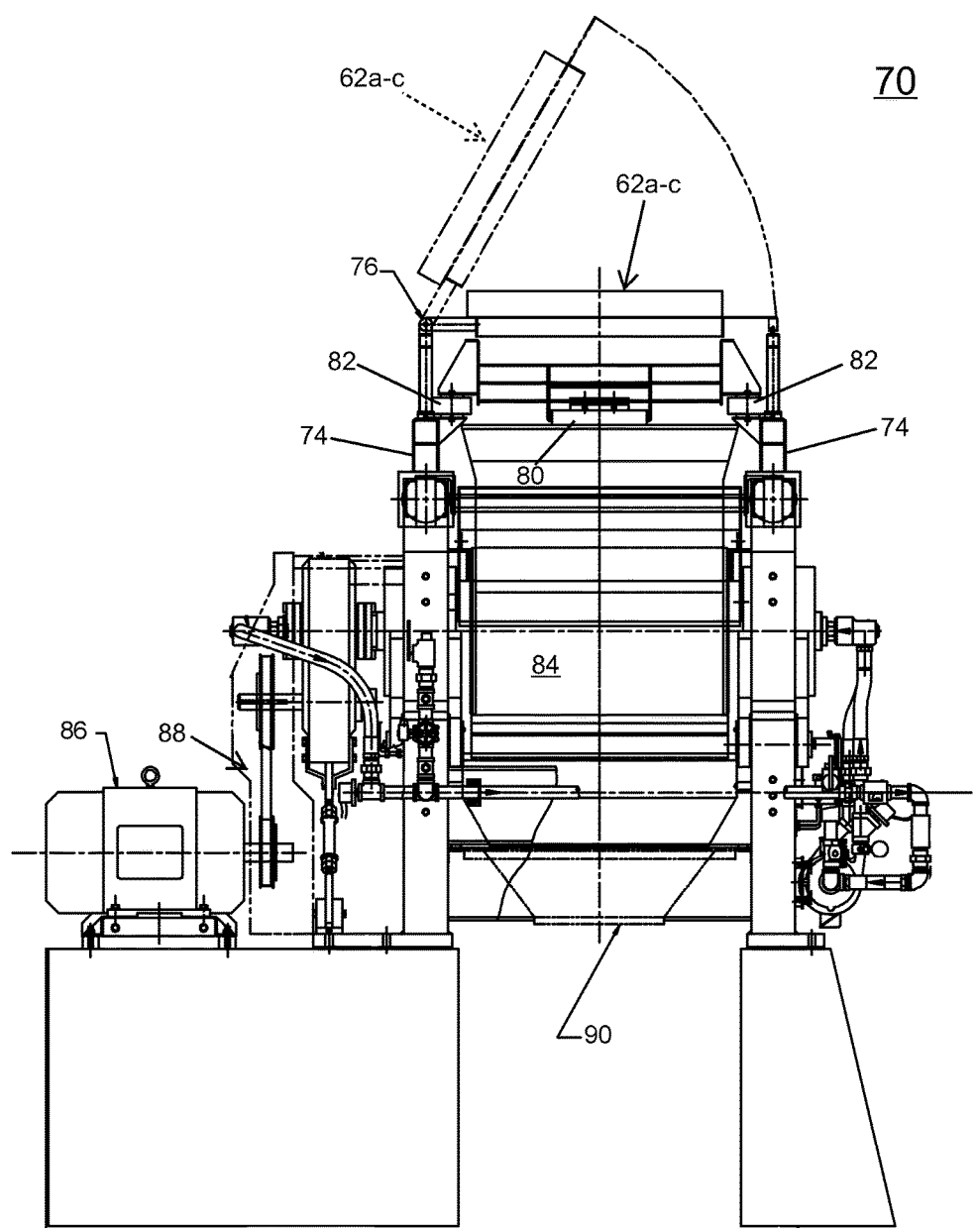
FIG. 5 is an end elevation of the grain conditioning and flaking apparatus of FIG. 4.
Figure 6:
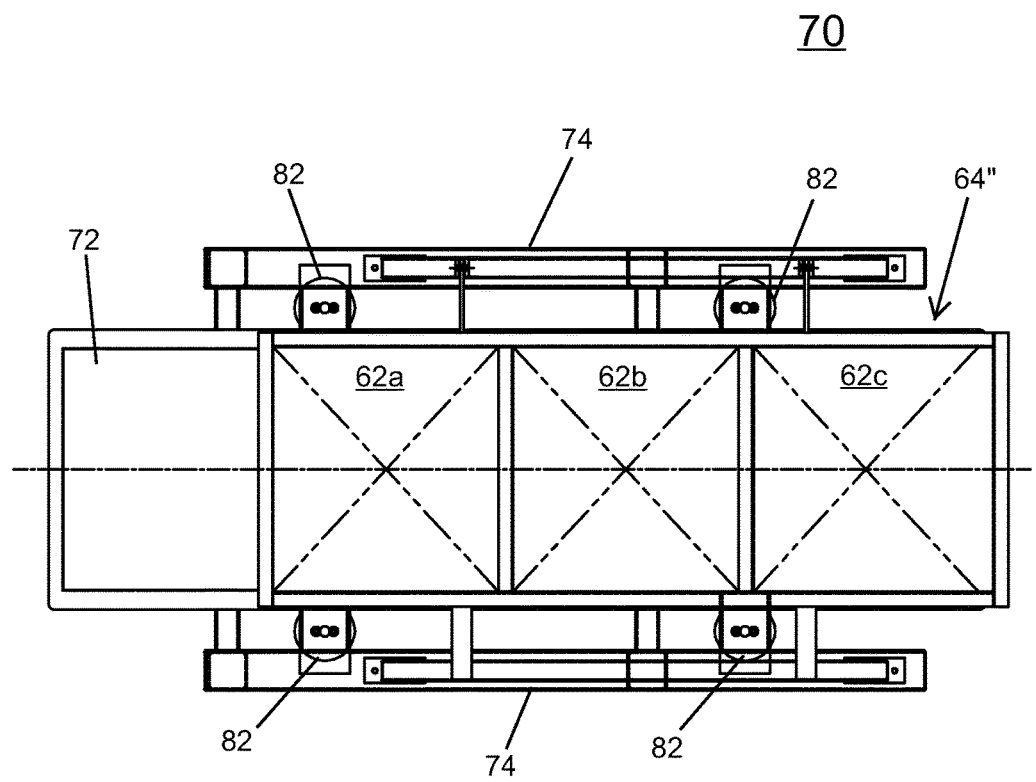
FIG. 6 is a top plan view of the grain conditioning and flaking apparatus of FIG. 4.

In the illustrated embodiment of FIGS. 4-6, conveyor 64" has a stepped pan 78 that is vibrated by a vibratory motor 80 (FIGS. 4 and 5) supported on framework 74, which also supports stepped pan 78 via a plurality of vibration isolators 82. In the illustrated embodiment, another feed chute 81 directs the conditioned grain from a downstream end portion of stepped pan 78 to a pair of motor-driven rollers 84 that form the grain pieces into flakes. Rollers 84 may have a longitudinal length of about 40 inches and a diameter of about 26 inches, and may be turned at about 167 rpm (about 1,137 linear feet per minute at the surface) by respective 75 hp motors 86 (FIG. 5) turning at 1200 rpm. When the rollers are turned at substantially the same speed as conditioned grain pieces pass between the rollers, this may be referred to as "bumping", while turning the rollers at different speeds from one another may be referred to as "flaking" the grain pieces. It will be appreciated that the rollers 84, motors 86, and substantially the entire grain-conditioning and flaking mill 70 may be scaled to substantially any desired size to meet particular throughput needs. Motors 86 are connected to the rollers 84 via respective belt drives 88 (FIG. 5). From rollers 84, the flakes drop through an outfeed chute 90 and into a hopper or another conveyor for final processing (e.g., toasting 54, coating 56, etc., such as shown in FIG. 1) of the flakes, prior to packaging. It will be appreciated that the rollers 84 of flaking mill 70 may be replaced with a puffing apparatus, a grinding mill, or other forming equipment to achieve a puffed or ground grain product, if desired, and without departing from the spirit and scope of the present invention.

Therefore, the present invention provides a method for converting shelf-stable grain particles from a hard crystalline structure to a pliable rubbery or soft texture, in order to prepare the grain particles for final forming, but without making them susceptible to mold or bacterial growth. This permits delays for storage and/or shipping/transportation of the grain between various steps involved in processing, which increases the flexibility of the manufacturing process and allows for the more efficient utilization of equipment. For example, earlier steps of the grain processing method may be carried out, and the resultant partially-processed products put into storage prior to carrying out further processing, even if equipment used in later processing steps is taken out of service for repair of maintenance. The partially processed grain products may be transported to a separate facility for final forming and processing, if necessary or desired.

Changes and modifications to the specifically-described embodiments may be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A multi-step grain conditioning apparatus comprising:
   a conveyor configured to move grain pieces in a flow direction from an upstream portion to a downstream portion of said conveyor;
   a first heater positioned along said conveyor near said upstream portion of said conveyor, wherein said first heater is operable to heat the grain pieces from an initial temperature to a first elevated temperature substantially without addition of moisture to the grain pieces;
   a second heater positioned along said conveyor between said upstream portion and said downstream portion of said conveyor, and spaced downstream from said first heater so as to provide a first cooling region along said conveyor between said first and second heaters, wherein said second heater is operable to heat the grain pieces to a second elevated temperature substantially without addition of moisture to the grain pieces;
   a third heater positioned along said conveyor near said downstream portion of said conveyor, and spaced downstream from said second heater so as to provide a second cooling region along said conveyor between said second and third heaters, wherein said third heater is operable to heat the grain pieces to a third elevated temperature substantially without addition of moisture to the grain pieces; and
   wherein said apparatus is operable to receive, at said upstream portion of said conveyor, the grain pieces having a water activity value of about 0.65 or less and further having an initial characteristic that is hard and brittle, and wherein said apparatus is operable to discharge, at said downstream portion of said conveyor, the grain pieces having a water activity value of about 0.65 or less and a subsequent characteristic that is softer and more pliable compared to the initial characteristic of the grain pieces.

2. The grain conditioning apparatus of claim 1, wherein said conveyor comprises a plurality of stepped surfaces at different vertical elevations.

3. The grain conditioning apparatus of claim 1, further comprising a vibratory motor operable to agitate the grain pieces along said conveyor and cause the grain pieces to move along said conveyor in the flow direction.

4. The grain conditioning apparatus of claim 1, further in combination with at least one chosen from: (i) a flaking mill, (ii) a bumping mill, and (iii) a puffing apparatus, which is operable to perform a final forming process on the grain pieces that exit said grain conditioning apparatus.

5. The grain conditioning apparatus of claim 1, wherein said first and third heaters comprise infrared heaters configured to emit infrared radiation at a wavelength of about 0.7 microns, and said second heater comprises an infrared heater configured to emit infrared radiation at a wavelength of about 0.5 microns.

6. The grain conditioning apparatus of claim 1, wherein said first, second, and third heaters are each spaced about 5 to 9.5 inches above a respective top surface region of said conveyor.

7. The grain conditioning apparatus of claim 6, wherein said first and third heaters comprise infrared heaters configured to emit infrared radiation at a wavelength of about 0.7 microns, and said second heater comprises an infrared heater configured to emit infrared radiation at a wavelength of about 0.5 microns.

8. The grain conditioning apparatus of claim 1, further comprising a first tempering apparatus disposed along said first cooling region between said first and second heaters, and a second tempering apparatus disposed along said second cooling region between said second and third heaters, wherein said first and second tempering apparatuses are operable to cool the grain pieces.

9. The grain conditioning apparatus of claim 8, wherein said first and second tempering apparatuses comprise air blowers that are operable to direct ambient air or chilled air onto the grain pieces at said first and second cooling regions, respectively.

10. A multi-step grain conditioning apparatus comprising:
a stepped conveyor configured to move grain pieces in a flow direction from an upstream portion to a downstream portion of said conveyor;
a first heater positioned above a first step region of said conveyor, wherein said first heater is operable to heat the grain pieces from an initial temperature to a first elevated temperature substantially without addition of moisture to the grain pieces;
a second heater positioned above a second step region of said conveyor, said second step region having a lower elevation than said first step region, and said second heater spaced downstream from said first heater so as to provide a first cooling region along said conveyor between said first and second heaters, wherein said second heater is operable to heat the grain pieces to a second elevated temperature substantially without addition of moisture to the grain pieces;
a third heater positioned above a third step region of said conveyor, said third step region having a lower elevation than said second step region, and said third heater spaced downstream from said second heater so as to provide a second cooling region along said conveyor between said second and third heaters, wherein said third heater is operable to heat the grain pieces to a third elevated temperature substantially without addition of moisture to the grain pieces.

11. The grain conditioning apparatus of claim 10, wherein said apparatus is operable to receive, at said upstream portion of said conveyor, the grain pieces having a water activity value of about 0.65 or less and further having an initial characteristic that is hard and brittle, and wherein said apparatus is operable to discharge, at said downstream portion of said conveyor, the grain pieces having a water activity value of about 0.65 or less and a subsequent characteristic that is softer and more pliable compared to the initial characteristic of the grain pieces.

12. The grain conditioning apparatus of claim 10, wherein said conveyor comprises a vibratory motor operable to agitate the grain pieces and cause the grain pieces to move along said conveyor in the flow direction.

13. The grain conditioning apparatus of claim 10, further in combination with at least one chosen from: (i) a flaking mill, (ii) a bumping mill, and (iii) a puffing apparatus, which is operable to perform a final forming process on the grain pieces that exit said grain conditioning apparatus.

14. The grain conditioning apparatus of claim 10, wherein said first and third heaters comprise infrared heaters configured to emit infrared radiation at a wavelength of about 0.7 microns, and said second heater comprises an infrared heater configured to emit infrared radiation at a wavelength of about 0.5 microns.

15. The grain conditioning apparatus of claim 10, wherein said first, second, and third heaters are each spaced about 5 to 9.5 inches above a respective top surface region of said conveyor.

16. The grain conditioning apparatus of claim 15, wherein said first and third heaters comprise infrared heaters configured to emit infrared radiation at a wavelength of about 0.7 microns, and said second heater comprises an infrared heater configured to emit infrared radiation at a wavelength of about 0.5 microns.

17. The grain conditioning apparatus of claim 10, further comprising a first tempering apparatus disposed along said first cooling region between said first and second heaters, and a second tempering apparatus disposed along said second cooling region between said second and third heaters, wherein said first and second tempering apparatuses are operable to cool the grain pieces.

18. The grain conditioning apparatus of claim 17, wherein said first and second tempering apparatuses comprise air blowers that are operable to direct ambient air or chilled air onto the grain pieces at said first and second cooling regions, respectively.

* * * * *